United States Patent [19]
Scannell

[11] 3,885,801
[45] May 27, 1975

[54] PACKING
[75] Inventor: John B. Scannell, Long Beach, Calif.
[73] Assignee: Parker-Hannifin Corporation, Cleveland, Ohio
[22] Filed: May 15, 1974
[21] Appl. No.: 470,205

Related U.S. Application Data
[63] Continuation of Ser. No. 201,018, Nov. 22, 1971, abandoned.

[52] U.S. Cl. ............... 277/165; 277/176; 277/188
[51] Int. Cl. ........................ F16j 15/32; F16j 9/00
[58] Field of Search .......... 277/176, 177, 165, 188, 277/211

[56] References Cited
UNITED STATES PATENTS

| | | | |
|---|---|---|---|
| 3,088,759 | 5/1963 | Corsette | 277/188 X |
| 3,172,670 | 3/1965 | Pras | 277/176 X |
| 3,215,441 | 11/1965 | Horvereid | 277/176 |
| 3,359,999 | 12/1967 | Mueller | 277/176 X |
| 3,608,913 | 9/1971 | D'Assignies | 277/165 |
| 3,642,290 | 12/1972 | Millsap | 277/101 |

FOREIGN PATENTS OR APPLICATIONS

| | | | |
|---|---|---|---|
| 1,084,137 | 9/1967 | United Kingdom | 277/198 |
| 1,166,648 | 6/1958 | France | 277/165 |
| 1,211,117 | 10/1959 | France | 277/188 |
| 1,105,348 | 4/1968 | United Kingdom | 277/165 |

Primary Examiner—Samuel B. Rothberg
Attorney, Agent, or Firm—John N. Wolfram

[57] ABSTRACT

A seal ring assembly for sealing in two directions, comprising an elastomeric seal ring with a pair of lips, solid elastomeric loading ring between the lips, and a pressure inverting pedestal ring active on the loading ring such that when fluid pressure is behind the pedestal ring the fluid pressure bypasses the pedestal ring and acts on the loading ring to deform the same to press the lips into sealing engagement with the members, and when fluid pressure is behind the seal ring the latter pushes the loading ring against the pedestal ring to likewise cause the loading ring to deform and press the lips into sealing engagement with the members.

3 Claims, 7 Drawing Figures

PACKING

BACKGROUND OF THE INVENTION

Lip type seals, such as the U or V shaped cross section, are normally used for sealing in one direction, that is, with fluid under pressure approaching the seal from the lip end whereby the fluid under pressure presses the lips into sealing engagement with the members to be sealed.

If fluid pressure approaches from the closed end of the seal, it acts to unseat the lips from the surfaces to be sealed and cause leakage. Heretofore, lip spreading devices have been used for pressing the lips into tight engagement with the parts to be sealed but such devices are generally not effective to prevent leakage when fluid under high pressure approaches the seal from its closed end.

Mechanical loading of the seal assembly, as heretofore known, results in a high constant sealing pressure on the lips in order to seal at both low and high fluid pressures.

SUMMARY OF THE INVENTION

This invention provides a generally U or V shaped seal ring having an elastomeric loading ring between the seal lips and arranged that when fluid under pressure approaches the seal from the lip end it acts on the loading ring and on the lips to force the lips outwardly into sealing engagement with the members to be sealed. This invention also provides a pedestal ring that is engageable with the loading ring so as to effectively deform the latter to cause the sealing lips to press into tight sealing engagement with the members to be sealed when high fluid pressure acts on the closed end of the seal rings.

Sealing pressure exerted by the lips, due to fluid pressure from either direction, is proportional to that fluid pressure. Thus the rate of seal ring wear is held to minimum by utilizing only the sealing pressure needed to prevent leakage.

The pedestal ring may have grooves to confine the lips and further press them into their sealing position.

In another form of the invention, the pedestal ring may comprise two parts, one of which is relatively hard and bears directly on the load ring and the other is of softer material and contains the grooves for engaging the sealing lips to cushion the same.

DETAILED DESCRIPTION

Figure 1:
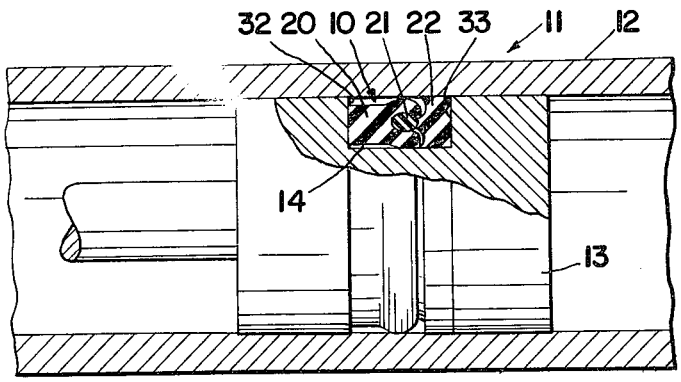
FIG. 1 is a longitudinal cross section of a cylinder showing a partial cross section of an integral piston employing a seal in accordance with the present invention.

FIG. 1 illustrates a seal assembly 10 designed to function equally well under fluid pressure from either direction thus making it suitable for use as a piston seal for double-acting hydraulic cylinders and the like. The cylinder 11 is composed of an outer casing 12 and a piston 13 disposed to act within the casing. The piston 13 has a groove 14 formed to receive the seal assembly 10.

Figure 2:
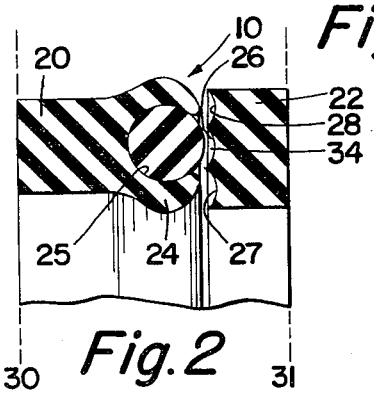
FIG. 2 shows a partial cross sectional view of the seal assembly of FIG. 1 in its free uncompressed state.

The seal assembly 10 shown enlarged in FIG. 2 consists of a lip seal ring 20, a lip loading ring 21, and a pedestal ring 22. The lip seal ring may be preferably made of elastomeric or plastic material such as synthetic rubbers, polyurethene or polytetrafluroethylene. The lip seal ring 20 has lips 23, 24 and an annnular groove 25 formed between the lips to receive the lip loading ring 21. Synthetic rubbers of approximately 70 Durometer, A scale hardness, are preferrable for the lip loading ring. The pedestal ring has a surface 26 to abut the lip loading ring. The pedestal ring is preferably composed of polyurethene, glass reinforced polyurethene, or polyamides of 95 to 100 Durometer, A scale hardness. the surface 26 is preferably concave but may be convex or planar. Concave surfaces 27, 28 may be formed in the pedestal ring to confine lips 23, 24 when the lip seal ring 20 is moved toward the pedestal ring due to reverse fluid pressure.

The dashed lines 30, 31 of FIG. 2 show the relative position of the ends 32, 33 of the groove 14. When the lips and the lip loading ring are in the free uncompressed state there is a space 34 located between the lip loading ring 20 and the pedestal ring 22.

Figure 3:
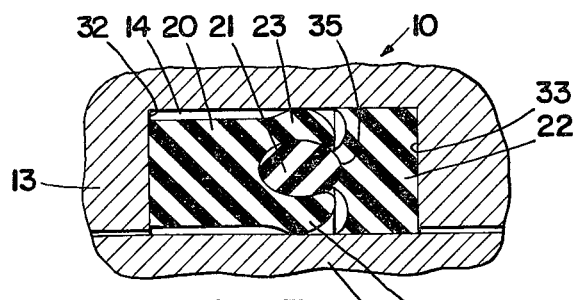
FIG. 3 shows an enlarged cross sectional view of the seal assembly of FIG. 1 under zero fluid pressure.

FIG. 3 shows the seal assembly after insertion into the groove 14 of the piston and compression by the cylinder casing 12. The lips 23, 24 are deflected radially toward the lip loading ring and are pushed toward the pedestal ring. The lip loading ring is radially compressed such that it axially extends toward the pedestal ring but is preferably substantially uncompressed axially by the pedestal ring. The loading ring may be slightly axially compressed by the pedestal ring.

Figure 4:
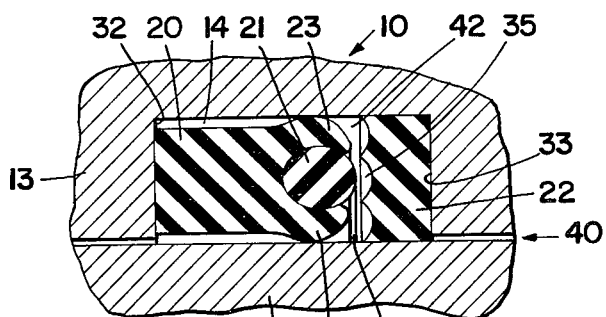
FIG. 4 shows the seal assembly of FIG. 3 under fluid pressure from the right side.

In FIG. 4 system fluid pressure is from the right as shown by the arrow 40. The pressure passes the pedestal ring and moves into spaces 41, 42 between the concave surfaces and lips leaving a space 35 between the pedestal ring and lip loading ring. Fluid pressure in these spaces acts on the lip loading ring 21 and the lips to increase the lip sealing force proportional to system fluid pressure.

Figure 5:
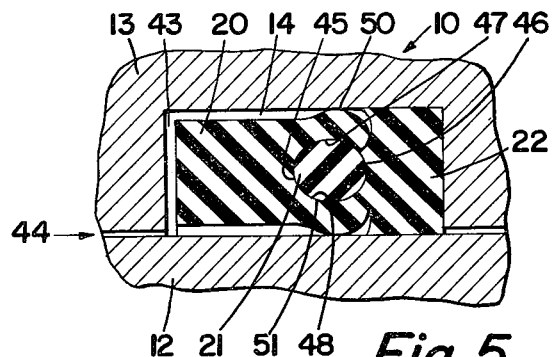
FIG. 5 shows the seal assembly of FIG. 3 under fluid pressure from the left side.

In FIG. 5, the lip seal ring is moved to the right leaving space 43 due to reverse system pressure as shown by arrow 44. The movement of the lip seal ring to the right causes the system pressure to act through the seal ring and the pedestal ring on the loading ring at 45, 46 respectively thereby forcing the loading ring to expand and exert sealing force on the lips at 47, 48. This force is transmitted through the lips to sealing surfaces 50, 51. The movement of the lip seal ring to the right also causes the lips to abut the concave surfaces thus transmitting partial system pressure through the lips to the sealing surfaces 50, 51.

Figure 6:
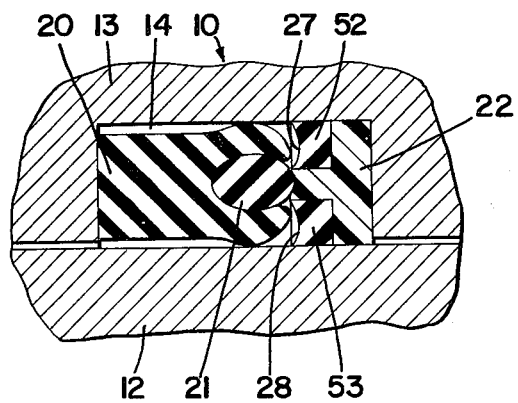
FIG. 6 is a view similar to FIG. 3 but showing another configuration of the pedestal ring.

FIG. 6 shows another form of the invention where the pedestal ring has soft inserts 52, 53. The concave surfaces 27, 28 are formed in the inserts 52, 53 respectively. At high reserve system pressures the soft inserts protect the lips of the sealing ring.

Figure 7:
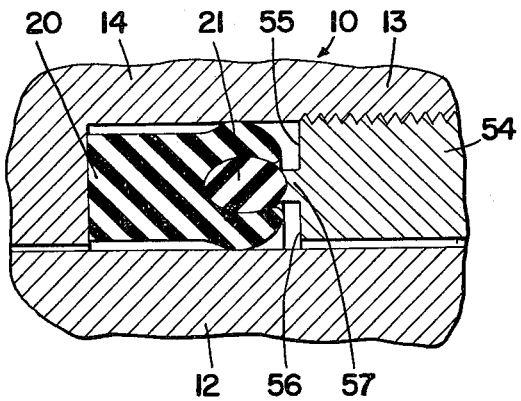
FIG. 7 is a view similar to FIG. 3 but showing another configuration of the pedestal ring.

FIG. 7 shows another form of the invention where the pedestal ring is an integral part 54 of the piston 13. This alternate form facilitates ease of assembly and replacement of the seal assembly. As shown, an alternate method of making an abutment for the lips is to provide planar surfaces 55, 56 to confine the lips under high reverse pressure.

I claim:

1. A sealing arrangement including two telescoped members, one of said members having a groove therein with a bottom wall radially opposite the other member, the groove having opposed end walls, one of said end walls having an axially projecting annular portion of less radial thickness than said groove, said one end wall being shaped to provide an annular space on each side of the projecting portion, a sealing assembly within said groove and comprising a sealing ring and a loading ring, the sealing ring comprising a body having inner and outer lips extending from one end thereof and defining an annular groove therebetween with an open end of substantially the same width as said projecting portion, each lip having a free end, said loading ring being within and initially substantially filling said annular groove and having an exposed end engageable with said projecting portion, said exposed end being initially substantially flush with the free ends of said lips, and said sealing and loading rings being made of deformable materials whereby upon fluid pressure being applied to the assembly from the other end of said body said projecting portion will enter the annular groove to deform the loading ring and sealing ring while confining the loading ring completely within said annular groove, and said lips will enter said spaces.

2. The assembly of claim 1 in which said exposed end is convex and said projection is concave where it engages said loading ring.

3. A sealing assembly for use between two members, comprising a deformable sealing ring, a deformable loading ring, and a pedestal ring, said sealing ring having radially inner and outer lips defining an annular groove therebetween, said loading ring being in said groove and substantially filling the same, said pedestal ring having an annular projection engageable with the loading ring for deforming the same, the free end of each lip having an inner corner adjacent the annular groove, and an outer corner spaced from the annular groove, the pedestal ring having cutaway portions on opposite sides of said projection, said inner corners being engageable with the projection of the pedestal ring to completely close said annular groove when fluid pressure is applied to the end of the sealing ring opposite the lips and causes deformation of said sealing and loading rings, and said outer corners being shaped to remain out of contact with said pedestal ring and said lips substantially completely filling said cutaway portions when fluid pressure is applied as aforesaid.

* * * * *